US007114040B2

(12) United States Patent
Yoder

(10) Patent No.: US 7,114,040 B2
(45) Date of Patent: Sep. 26, 2006

(54) DEFAULT LOCALITY SELECTION FOR MEMORY OBJECTS BASED ON DETERMINING THE TYPE OF A PARTICULAR MEMORY OBJECT

(75) Inventor: Michael E. Yoder, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 10/791,261

(22) Filed: Mar. 2, 2004

(65) Prior Publication Data

US 2005/0198444 A1 Sep. 8, 2005

(51) Int. Cl.
*G06F 12/08* (2006.01)

(52) U.S. Cl. .................. 711/148; 711/127; 711/132; 711/147; 711/157

(58) Field of Classification Search .............. 711/148
See application file for complete search history.

(56) References Cited

U.S. PATENT DOCUMENTS

| 5,630,088 | A | | 5/1997 | Gupta et al. | |
|---|---|---|---|---|---|
| 5,699,539 | A | * | 12/1997 | Garber et al. | 711/2 |
| 6,272,612 | B1 | * | 8/2001 | Bordaz et al. | 711/203 |
| 6,381,682 | B1 | * | 4/2002 | Noel et al. | 711/153 |
| 6,516,342 | B1 | * | 2/2003 | Feldman et al. | 709/216 |
| 6,567,900 | B1 | * | 5/2003 | Kessler | 711/157 |
| 6,598,130 | B1 | * | 7/2003 | Harris et al. | 711/147 |
| 6,871,219 | B1 | * | 3/2005 | Noordergraaf et al. | 709/214 |
| 6,970,990 | B1 | * | 11/2005 | Rogers et al. | 711/200 |

OTHER PUBLICATIONS

Numeric Quest Inc., "Multithreading—Definitions and Guideliness", Jan. 3, 1998, accessed at http://courses.cs.deu.edu.tr/cse405/lang/multi-defs.html on Mar. 29, 2006.*
Asche, Ruediger R., "Multithreading for Rookies", Sep. 24, 1993, Microsoft Developer Network Technology Group, accessed at http://msdn.microsoft.com/library/default.asp?url=/library/en-us/dndllpro/html/msdn_threads.asp on Mar. 29, 2006.*
B.C. Brock, et al., "Experience with building a commodity Intel-based ccNUMA system", Mar. 2001, pp. 207-227, IBM J. Res. & Dev. vol. 45 No. 2.
HP-UX Memory Management White Paper Version 1.3, Apr. 7, 1997, pp. 1-112, Copyright 1997, Hewlett-Packard Company.

* cited by examiner

Primary Examiner—Donald Sparks
Assistant Examiner—Arpan Savla

(57) ABSTRACT

One embodiment disclosed relates to a method of selecting a default locality for a memory object requested by a process running on a CPU in a multiprocessor system. A determination is made as to whether the memory object comprises a shared-memory object. If the memory object comprises said shared-memory object, then the default locality is selected to be within interleaved memory in the system. If not, a further determination may be made as to whether the memory object comprises a stack-type object. If the memory object comprises said stack-type object, then the default locality may be selected to be within local memory at a same cell as the requesting CPU. If not, a further determination may be made as to whether the requesting process has threads running on multiple cells.

15 Claims, 5 Drawing Sheets

_US 7,114,040 B2_

DEFAULT LOCALITY SELECTION FOR MEMORY OBJECTS BASED ON DETERMINING THE TYPE OF A PARTICULAR MEMORY OBJECT

BACKGROUND OF THE INVENTION

1. Field of the Invention

The present invention relates generally to memory management in computing systems.

2. Description of the Background Art

Conventionally, a multiprocessing system is a computer system that has more than one processor, and that is typically designed for high-end workstations or file server usage. The performance of a multiprocessing system is not necessarily improved by simply increasing the number of processors in the multiprocessing system. This is because the continued addition of processors past a certain saturation point serves merely to increase communication bottlenecks and thereby limit the overall performance of the system. Thus, although conceptually simple, the implementation of a parallel computing system is in fact very complicated, involving tradeoffs among single-processor performance, processor-to-processor communication performance, ease of application programming, and managing costs.

Parallel computing embraces a number of computing techniques that can be generally referred to as "multiprocessing" techniques. There are many variations on the basic theme of multiprocessing. In general, the differences are related to how independently the various processors operate and how the workload among these processors is distributed.

Two common multiprocessing techniques are symmetric multiprocessing systems ("SMP") and distributed memory systems. One characteristic distinguishing the two lies in the use of memory. In an SMP system, high-speed electronic memory may be accessed, i.e., shared, by all the CPUs in the system: In a distributed memory system, none of the electronic memory is shared among the processors. In other words, each processor has direct access only to its own associated fast electronic memory, and must make requests to access memory associated with any other processor using some kind of electronic interconnection scheme involving the use of a software protocol. There are also some "hybrid" multiprocessing systems that try to take advantage of both SMP and distributed memory systems.

SMPs can be much faster, but at higher cost, and cannot practically be built to contain more than a modest number of CPUs, e.g, a few tens. Distributed memory systems can be cheaper, and scaled arbitrarily, but the program performance can be severely limited by the performance of the interconnect employed, since it (for example, Ethernet) can be several orders of magnitude slower than access to local memory.)

In a hybrid system, multiple CPUs are usually grouped, or "clustered," into cells. These cells may be referred to as SMP nodes. Shared memory is distributed across the SMP nodes, with each SMP node including at least some of the shared memory. The shared memory within a particular node is "local" to the CPUs within that node and "remote" to the CPUs in the other nodes. One drawback with hybrid systems lies in bottlenecks encountered in retrieving data. Because of the hardware involved and the way it operates, data transfer between a CPU and the local memory can be, for example, 10 to 100 times faster than the data transfer rates between the CPU and the remote memory. Consequently, the problem of how to expose the maximum available performance to the applications programmer is an interesting and challenging exercise. This problem is exacerbated by the fact that most parallel programming applications are developed for either pure SMP systems or for pure distributed memory systems.

One specific type of hybrid multiprocessing system utilizes a cache-coherent non-uniform memory architecture (ccNUMA). A typical design for a ccNUMA system uses several SMP systems as computing nodes and connects them with a cache-coherent switch that supports shared memory across all the processors.

SUMMARY

One embodiment of the invention relates to a method of selecting a default locality for a memory object requested by a process running on a CPU in a multiprocessor system. A determination is made as to whether the memory object comprises a shared-memory object. If the memory object comprises said shared-memory object, then the default locality is selected to be within interleaved memory in the system. If not, a further determination may be made as to whether the memory object comprises a stack-type object. If the memory object comprises said stack-type object, then the default locality may be selected to be within local memory at a same cell as the requesting CPU. If not, a further determination may be made as to whether the requesting process has threads running on multiple cells.

DETAILED DESCRIPTION

The following discussion describes one or more embodiments of the invention. In the interest of clarity, not all features of an actual implementation are described in this specification. It will be appreciated that, in the development of any such actual embodiment, numerous implementation-specific decisions must be made to achieve the developers' specific goals. Such details might include compliance with system-related and business-related constraints, which will vary from one implementation to another, for instance. Moreover, it will be appreciated that such a development effort, even if complex and time-consuming, would be a routine undertaking for those of ordinary skill in the art having the benefit of this disclosure.

Figure 1:
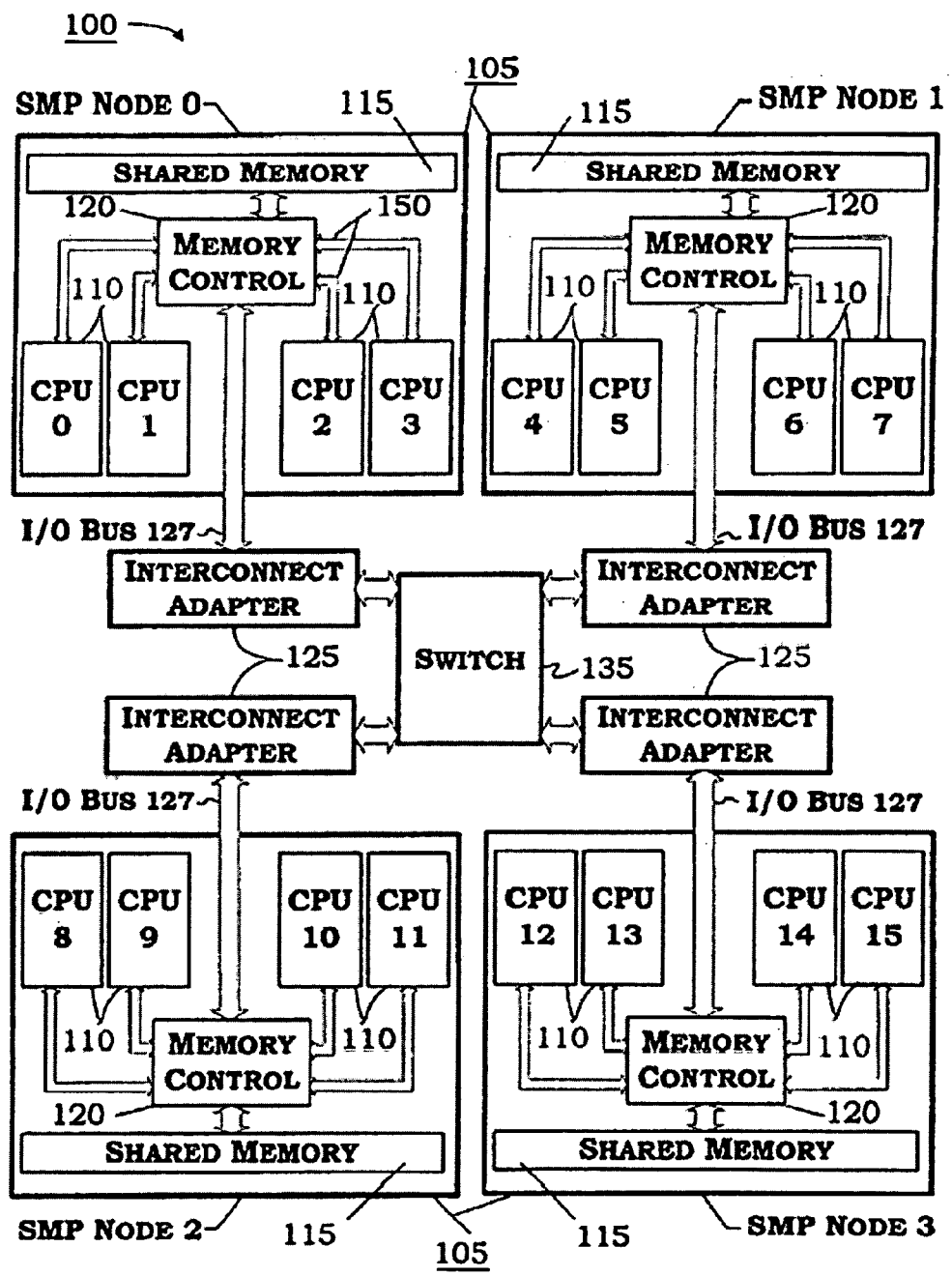
FIG. 1 is a schematic diagram of an example computing system within which the invention may be embodied.

FIG. 1 is a schematic diagram of an example computing system 100 within which the invention may be embodied. The computing system 100 is, in this particular embodiment, a hybrid computing system exhibiting characteristics of both an SMP computing system and a distributed memory computing system. The computing system 100 may comprise a ccNUMA type system. The computing system 100 comprises a plurality of SMP nodes 105. Each SMP node 105 may also be referred to as a "cell". Each SMP node 105 includes a plurality of CPUs 110 connected to a common shared memory system 115 via a memory control unit 120. Each memory control unit 120 also allows access, via an input/output ("I/O") bus 127, to an interconnect adapter 125. The interconnect adapters 125 allow each SMP node 105 to communicate with the switch 135 to access memory locations on the other SMP nodes 105 in the computing system 100. The switch 135 may comprise a cross-bar type switch and may include cache-coherent features.

The CPUs 110 of each SMP node 105 communicate over a bus 150. The information on the buses 150 flows at higher rates and with lower latencies, than the information flowing on the I/O bus 127 and through the switch 135. Typically, local accesses via the local memory controller 120, are roughly ten to one hundred times faster than memory accessed via the switch 135 or even the interconnect adapters 125. Thus, it is highly desirable to access data from the shared memory 115 within the same SMP node 105 through the local memory controller 120 rather than from a remote memory in another SMP node 105.

The computing system 100 may employ any suitable operating system ("OS") to control and direct its operations. One particular implementation employs the HP-UX OS available from the Hewlett Packard Company. However, the invention is not so limited to that particular OS. In accordance with an embodiment of the invention, the operating system supports multi-threaded processes.

The computing system 100 is but one hardware implementation that may be configured and operated in accordance with the present invention. The diagram shows four SMP nodes, each directly connected to a single switch for simplicity, but many other configurations of SMP nodes and switches are possible, including configurations with two, four, eight, sixteen, thirty-two or even hundreds of processors and multiple switches. Likewise, the SMP nodes 105 may include more, or fewer, CPUs 110. Thus, the computing system 100 is but one example, and many other hardware implementations may be employed.

Figure 2:
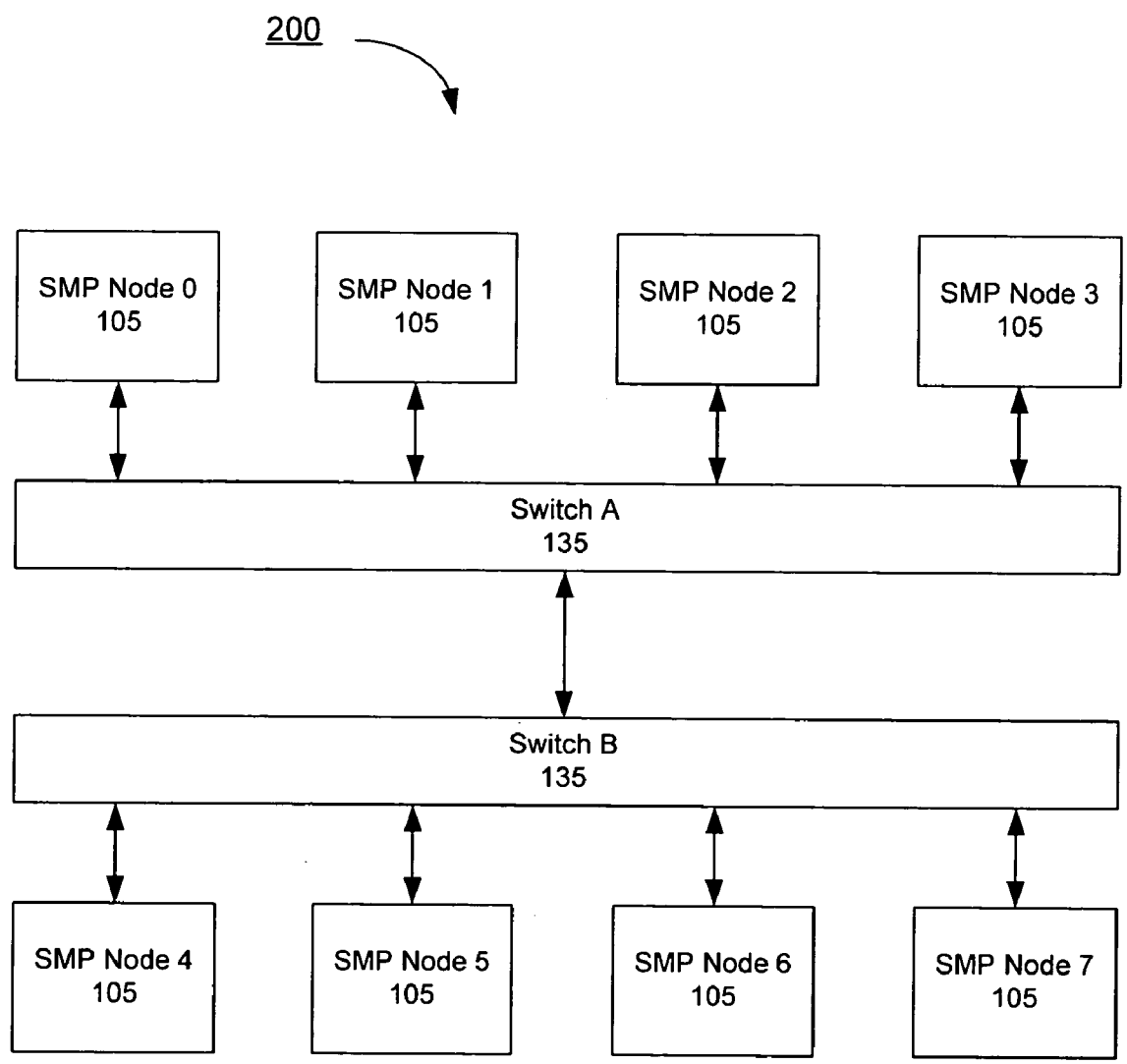
FIG. 2 is a schematic diagram of another example computing system within which the invention may be embodied.

FIG. 2 is a schematic diagram of another example computing system 200 within which the invention may be embodied. This example system 200 includes eight SMP nodes 105. Four of the SMPs 105 (Nodes 0, 1, 2, and 3) are interconnected by way of a first switch 135 (Switch A). The other four SMPs 105 (Nodes 4, 5, 6, and 7) are interconnected by way of a second switch 135 (Switch B). The first and second switches are interconnected with each other. Note that additional components are also present in the system 200, though they are not explicitly shown for purposes of clear explanation of the inventive concepts herein.

Figure 3:
FIG. 3 is a diagram depicting shared memory including both local memory pages and interleaved memory pages in accordance with an embodiment of the invention.

FIG. 3 is a diagram depicting shared memory 115 including both local memory pages 302 and interleaved memory pages 304 in accordance with an embodiment of the invention. Shared memory pages 115 at each SMP node 105 may be of two types. A first type is a local memory page 302, and a second type is an interleaved memory page 304. The amount of each type may be configurable by the operating system. A local memory page 302 resides entirely at one SMP node 105. In contrast, an interleaved memory page 304 is divided such that it resides on multiple SMP nodes. For example, in FIG. 1, a first stripe of an interleaved page 304 may reside at Node 0, a second stripe of the page may be at Node 1, a third stripe of the page may be at Node 2, a fourth stripe of the page may be at Node 3, then back again, such that a fifth stripe of an interleaved page 304 may reside at Node 0, a sixth stripe of the page may be at Node 1, a seventh stripe of the page may be at Node 2, an eighth stripe of the page may be at Node 3, and so on.

The local memory pages 302 may be categorized into different locality levels based upon its location in the system relative to a particular CPU. A local memory page is at the closest locality level is when the page is at a same SMP node as the pertinent CPU. A local memory page is at the second closest locality level is when the page is at a neighboring SMP node which is reachable via a single intervening switch. A local memory page is at the third closest locality level is when the page is at an SMP node which is reachable via two intervening switches. And so on. For example, consider the CPU 1 in the system 100 of FIG. 1. CPU 1 is located at SMP Node 0. With respect to CPU 1, the closest locality level comprises the local memory pages also at SMP Node 0. The second closest locality level comprises the local memory pages at any of SMP Nodes 1, 2, or 3. As another example, consider SMP Node 5 in the system 200 of FIG. 2. With respect to SMP Node 5, the closest locality level comprises the local memory pages also at SMP Node 5. The second closest locality level comprises the local memory pages at any of SMP Nodes 4, 6, and 7. The third closest locality level comprises the local memory pages at any of SMP Nodes 0, 1, 2, and 3.

Figure 4:
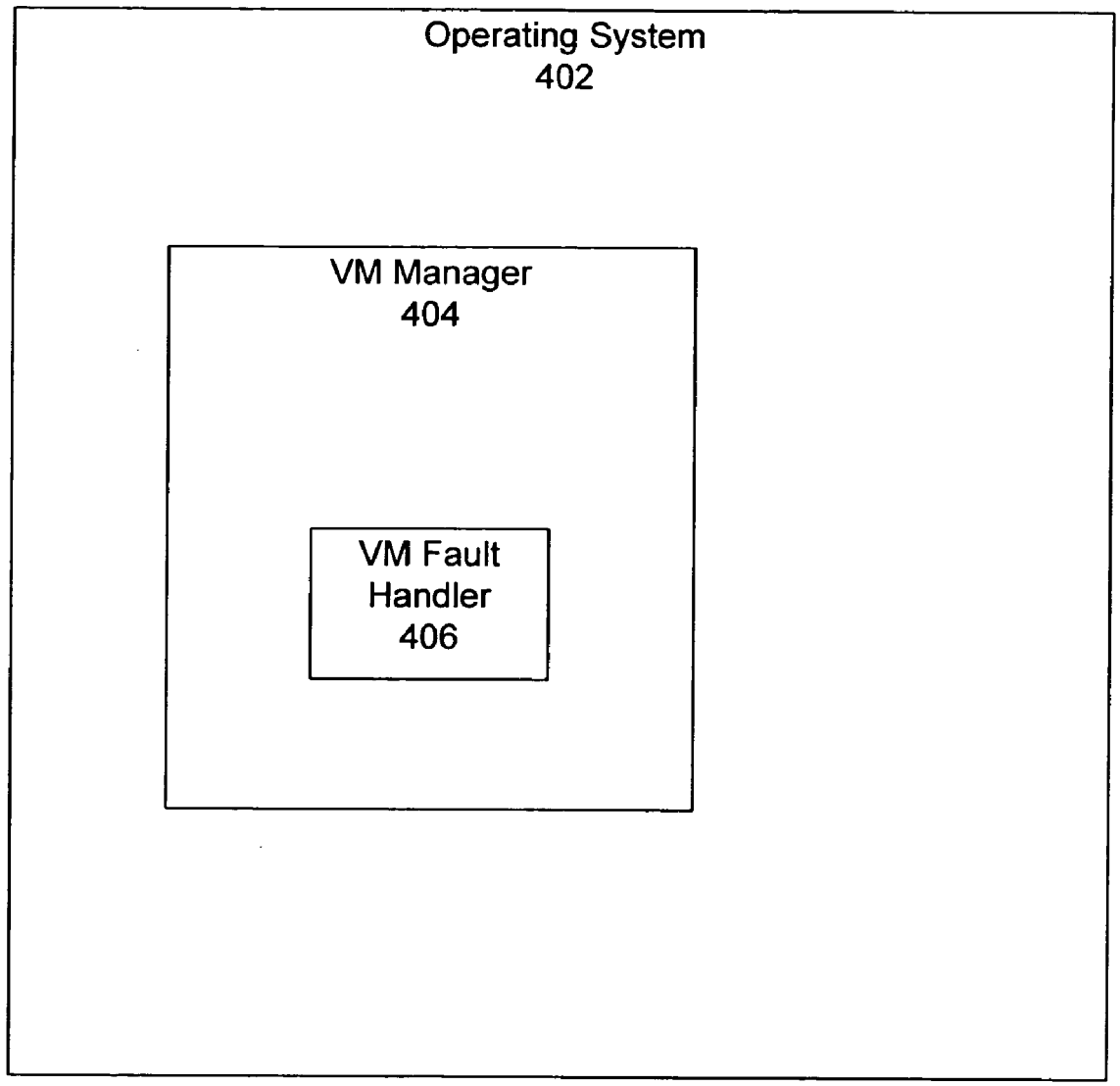
FIG. 4 is a diagram depicting select software components of a system in accordance with an embodiment of the invention.

FIG. 4 is a diagram depicting select software components of a system in accordance with an embodiment of the invention. The system software includes an operating system 402 that runs on each of the CPUs. The operating system 402 includes various modules, including a virtual memory manager 404. The virtual memory (VM) manager 404 provides for the memory space to be extended beyond the limits of the physical address space. The VM manager 404 includes, among other modules, a VM fault handler 406. Because the memory space is divided into pages, the VM fault handler 406 may also be called a page fault handler.

When a CPU desires to access a memory address, the desired memory address is presented to the VM manager 404. The VM manager 404 checks to see if it has a translation for this memory address into a physical address. If the VM manager 404 does not have a translation for this memory address, then it interrupts the CPU and causes the page fault handler 406 to be executed. The page fault handler 406 determines a resolution for the page fault.

Figure 5:
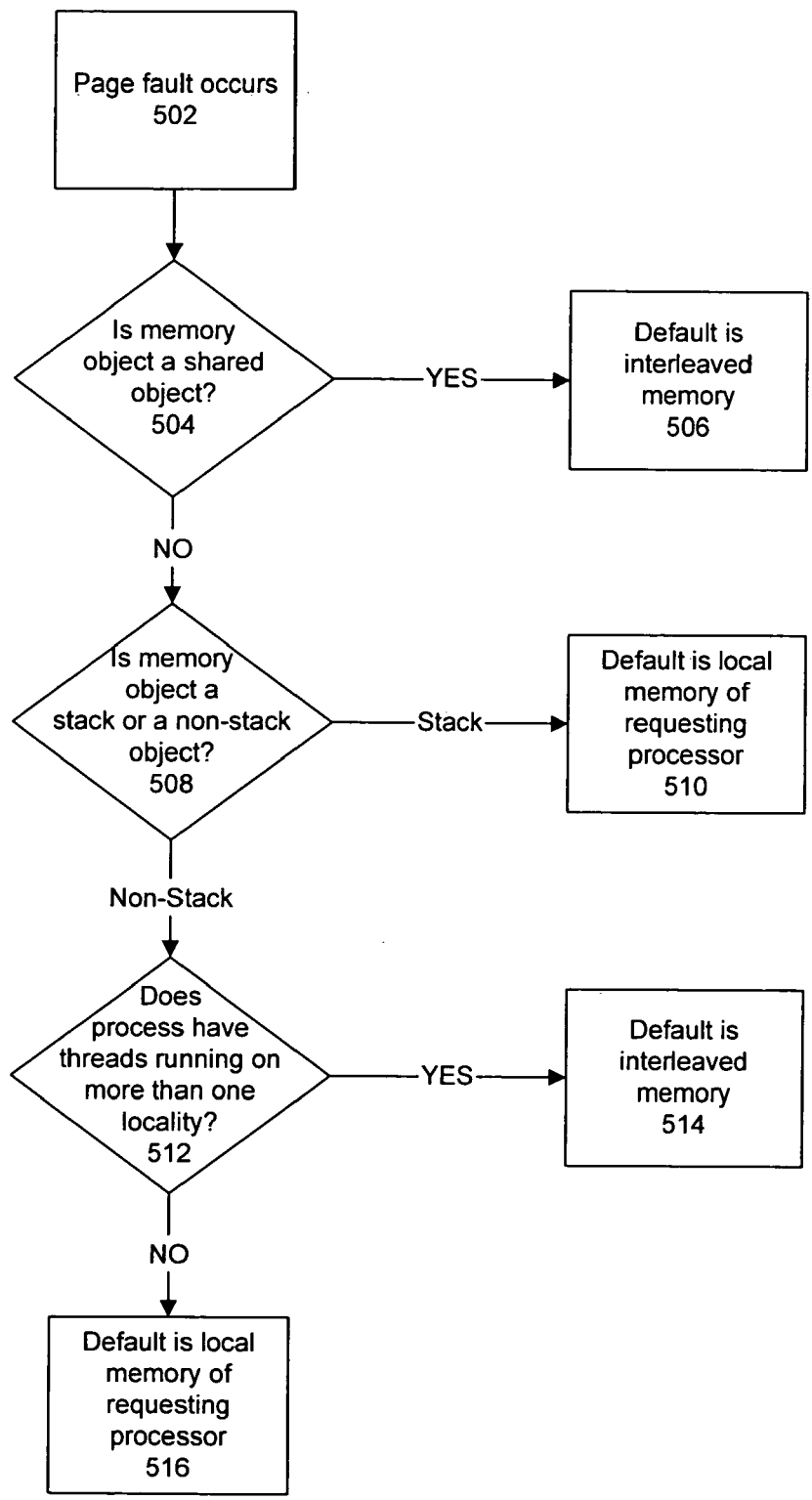
FIG. 5 is a flow chart depicting a method of intelligent default locality selection for memory objects in accordance with an embodiment of the invention.

FIG. 5 is a flow chart depicting a method 500 of intelligent default locality selection for memory objects in accordance with an embodiment of the invention. The method 500 is utilized after a page fault occurs 502 such that the VM fault handler 406 is executed.

One of the responsibilities of the page fault handler 406 involves selecting and allocating a page of physical memory to resolve the fault. In a non-uniform memory architecture (NUMA) system, different regions of physical memory have different bandwidth and latency characteristics. This complicates the selection of physical memory. The goal of such selection is to acquire a physical memory page that will be "close" to CPUs needing to access that page. The choices for locating the physical memory page may include within memory local to a particular cell and memory interleaved between multiple cells. The interleaved memory may be configured so that access time to the interleaved memory is approximately equal for each CPU in the multiprocessor system.

In accordance with an embodiment of the invention, a determination 504 is made by instructions within the VM fault handler 406 as to whether the memory object comprises a shared-memory object. If the memory object comprises said shared-memory object, then the default locality is selected 506 by instructions within the VM fault handler 406 to be within interleaved memory 304. As discussed above, each interleaved memory page is divided so that part of it resides on each cell 105 in the system. Shared objects may be accessed from any CPU 110 on the system. Hence, the selection 506 of interleaved memory 304 is advantageous in that the interleaved memory 304 provides uniform or approximately uniform memory access times no matter from which CPU 110 the access is made. In the case where there is no interleaved memory 304 (either the system has none or none is available), then local memory 302 from a specific cell 105 may be selected. The specific cell 105 may be selected, for example, using a round-robin type algorithm such that the cell selected rotates amongst all the cells 105 in the system. Other algorithms may also be employed in alternate embodiments.

If the memory object does not comprise a shared-memory object, then a further determination 508 is made by instructions within the VM fault handler 406 as to whether the memory object comprises a stack-type object. An example of a stack-type object is a process stack. As another example, the user structure (UAREA) of Unix type operating systems may also comprise a stack-type object. If the memory object comprises the stack-type object, then the default locality is selected 510 by instructions within the VM fault handler 406 to be within local memory 302 at the cell 105 of the requesting CPU 110. This selection 510 is advantageous because stacks are generally private to a particular thread of execution, so efficiency is optimized by locating the memory for that stack as close as possible to the CPU 110 running that thread.

If the memory object comprises a non-stack-type object, then a further determination 512 is made by instructions within the VM fault handler 406 whether the requesting process has threads running on multiple cells 105. If the requesting process has threads running on said multiple cells 105, then the default locality is selected 514 by instructions within the VM fault handler 406 to be within the interleaved memory 304. This selection 514 is advantageous because accesses to this memory page (though coming from a single process) are likely to come from more than one cell 105, so interleaved memory 304 provides uniform or nearly uniform access to the distributed processors. Again, in the case where there is no interleaved memory (either the system has none or none is available), then local memory 302 from a specific cell 105 may be selected. The specific cell 105 may be selected, for example, using a round-robin type algorithm. Other algorithms may also be employed in alternate embodiments.

Otherwise, if the requesting process has threads running only on the cell 105 of the requesting CPU 110, then the default locality is selected 516 by instructions within the VM fault handler 406 to be within the local memory 302 at the cell 105 of the requesting CPU 110. This selection 516 is advantageous because this memory page is to be accessed from a single cell 105, so locating the memory page as close as possible to the CPUs 110 in that cell 105 optimizes efficiency.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A multiprocessor apparatus including multiple processors and computer-readable memory, said memory comprising:
   computer-readable code configured to determine whether a memory object requested by a process running on a processor comprises a shared-memory object; and
   computer-readable code configured to select a default locality to be within interleaved memory of the multiprocessor apparatus if the memory object comprises said shared-memory object.

2. The multiprocessor apparatus of claim 1, further comprising:
   computer-readable code configured to determine whether the memory object comprises a stack-type object; and
   computer-readable code configured to select the default locality to be within local memory at a same cell as the reguesting processor if the memory object comprises the stack-type object.

3. The multiprocessor apparatus of claim 2, further comprising:
   computer-readable code configured to determine whether the requesting process has threads running on multiple cells if the memory object comprises a non-stack-type object.

4. The multiprocessor apparatus of claim 3, further comprising:
   computer-readable code configured to select the default locality to be within the interleaved memory of the system if the requesting process has threads running on said multiple cells.

5. The multiprocessor apparatus of claim 3, further comprising:
   computer-readable code configured to select the default locality to be within the local memory at the same cell as the requesting processor if the requesting process has threads running on only one cell.

6. The multiprocessor apparatus of claim 1, wherein access time to the interleaved memory is approximately equal for each CPU in the multiprocessor system.

7. The multiprocessor apparatus of claim 2, wherein the stack-type object comprises a process stack.

8. The multiprocessor apparatus of claim 2, wherein the stack-type object comprises a UAREA type object.

9. A multiprocessor computing system, the system comprising:
   multiple symmetric multiprocessing (SMP) nodes;
   multiple central processing units (CPUs) at each SMP node;
   a memory control unit at each SMP node which is coupled to each CPU at that SMP node;
   shared memory at each SMP node which is accessible by way of the memory control unit at that SMP node;
   a switching system coupled to the memory control units so as to interconnect the multiple SMP nodes;

an operating system running on the CPUs; and a virtual memory (VM) fault handler within the operating system, wherein the shared memory includes both local memory and interleaved memory, and wherein the VM fault handler executes instructions to provide intelligent default locality selection for memory obiects requested by a process running on a CPU, and wherein said instructions executed by the VM fault handler (a) determine whether the memory object comprises a shared-memory object, and (b) select the default locality to be within the interleaved memory of the system if the memory object comprises said shared-memory object.

10. The multiprocessor computing system of claim 9, wherein said instructions executed by the VM fault handler also (c) determine whether the memory object comprises a stack-type object, and (d) select the default locality to be within local memory at a same SMP node as the requesting CPU if the memory object comprises the stack-type object.

11. The multiprocessor computing system of claim 10, wherein said instructions executed by the VM fault handler also (e) determine whether the requesting process has threads running on multiple SMP nodes if the memory object comprises a non-stack-type object, (f) select the default locality to be within the interleaved memory of the system if the requesting process has threads running on said multiple SMP nodes, and (g) select the default locality to be within the local memory at the same SMP node as the requesting CPU if the requesting process has threads running on only one SMP node.

12. The multiprocessor computing system of claim 9, wherein the switching system includes multiple switches interconnected together.

13. The multiprocessor computing system of claim 9, wherein access time to the interleaved memory is approximately equal for each CPU in the multiprocessor system.

14. The multiprocessor computing system of claim 10, wherein the stack-type object comprises a process stack.

15. The multiprocessor computing system of claim 10, wherein the stack-type object comprises a UAREA type object.

* * * * *

UNITED STATES PATENT AND TRADEMARK OFFICE
CERTIFICATE OF CORRECTION

PATENT NO.         : 7,114,040 B2                              Page 1 of 1
APPLICATION NO. : 10/791261
DATED              : September 26, 2006
INVENTOR(S)        : Michael E. Yoder It is certified that error appears in the above-identified patent and that said Letters Patent is hereby corrected as shown below:

In column 6, line 30, in Claim 2, delete "reguesting" and insert -- requesting --, therefor.

In column 7, line 8, in Claim 9, delete "obiects" and insert -- objects --, therefor.

Signed and Sealed this

Fourth Day of August, 2009

JOHN DOLL
*Acting Director of the United States Patent and Trademark Office*